(12) United States Patent
Grbic et al.

(10) Patent No.: US 9,824,491 B2
(45) Date of Patent: Nov. 21, 2017

(54) DATA DRIVEN FRAMEWORK FOR OPTIMIZING ARTIFICIAL ORGAN PRINTING AND SCAFFOLD SELECTION FOR REGENERATIVE MEDICINE

(71) Applicant: Siemens Healthcare GmbH, Erlangen (DE)

(72) Inventors: Sasa Grbic, Princeton, NJ (US); Dorin Comaniciu, Princeton Junction, NJ (US)

(73) Assignee: Siemens Healthcare GmbH, Erlangen (DE)

(*) Notice: Subject to any disclaimer, the term of this patent is extended or adjusted under 35 U.S.C. 154(b) by 78 days.

(21) Appl. No.: 14/849,449

(22) Filed: Sep. 9, 2015

(65) Prior Publication Data

US 2017/0069131 A1    Mar. 9, 2017

(51) Int. Cl.
*B29C 67/00* (2017.01)
*B29L 31/00* (2006.01)
(Continued)

(52) U.S. Cl.
CPC .......... *G06T 17/10* (2013.01); *B29C 67/0088* (2013.01); *B33Y 10/00* (2014.12); *B33Y 30/00* (2014.12); *B33Y 50/00* (2014.12); *G05B 19/4099* (2013.01); *G06F 3/1205* (2013.01); *G06F 3/1253* (2013.01); *G06F 3/1297* (2013.01); *G06T 7/0012* (2013.01);
(Continued)

(58) Field of Classification Search
CPC ......... B29C 67/0088; B29L 2031/7532; B33Y 10/00; B33Y 50/00; G06F 3/1205; G06F 3/1253; G06F 3/1297; G06T 7/0012; G06T 7/60; G06T 11/003; G06T 17/10; G06T 2207/10028; G06T 2207/10072; G06T 2207/30024; G06T 2211/416; H04N 7/183
See application file for complete search history.

(56) References Cited

U.S. PATENT DOCUMENTS 7,468,075 B2    12/2008  Lang et al.
2005/0185837 A1*  8/2005  Takano ............... H04N 1/4072
                                                          382/162
(Continued)

FOREIGN PATENT DOCUMENTS

CN    101264035    9/2008
CN    103584932    2/2014
(Continued)

OTHER PUBLICATIONS

D. Schmauss et al: "Three-dimensional printing in cardiac surgery and interventional cardiology: a single-centre experience", European Journal of Cardio-Thoracic Surgery; vol. 47, No. 6; pp. 1044-1052, XP055298897; DE; ISSN: 1010-7940, DOI: 10.1093/ejcts/ezu310 / 26.08.2014.

*Primary Examiner* — Jennifer L Norton

(57) ABSTRACT

A method for generating a personalized scaffold for an individual includes acquiring images of an anatomy of interest corresponding to an intended scaffold location and acquiring test results related to the anatomy of interest. One or more functional specifications are generated based on the images and test results and one or more scaffold parameters are selected based on the functional specifications. A final scaffold may then be generated using the one or more scaffold parameters.

8 Claims, 4 Drawing Sheets

(51) Int. Cl.

| | | |
|---|---|---|
| *B33Y 10/00* | (2015.01) | |
| *B33Y 30/00* | (2015.01) | |
| *B33Y 50/00* | (2015.01) | |
| *G05B 19/4099* | (2006.01) | |
| *G06F 3/12* | (2006.01) | |
| *G06T 7/00* | (2017.01) | |
| *G06T 7/60* | (2017.01) | |
| *G06T 11/00* | (2006.01) | |
| *G06T 17/10* | (2006.01) | |
| *H04N 7/18* | (2006.01) | |
| *G06T 7/70* | (2017.01) | |

(52) U.S. Cl.
CPC ............... *G06T 7/60* (2013.01); *G06T 7/70* (2017.01); *G06T 11/003* (2013.01); *H04N 7/183* (2013.01); *B29L 2031/7532* (2013.01); *G06T 2207/10028* (2013.01); *G06T 2207/10072* (2013.01); *G06T 2207/30024* (2013.01); *G06T 2211/416* (2013.01)

(56) References Cited

U.S. PATENT DOCUMENTS

| | | | |
|---|---|---|---|
| 2012/0116568 A1* | 5/2012 | Murphy | B41J 3/407 700/118 |
| 2012/0224755 A1* | 9/2012 | Wu | G06T 17/00 382/131 |
| 2014/0025181 A1 | 1/2014 | Vanasse et al. | |
| 2014/0277678 A1 | 9/2014 | Vesto | |
| 2014/0379119 A1 | 12/2014 | Sciacchitano et al. | |
| 2015/0032421 A1* | 1/2015 | Dean | G06T 19/00 703/1 |
| 2015/0036174 A1* | 2/2015 | Pettis | G06F 3/1288 358/1.15 |
| 2015/0051885 A1* | 2/2015 | Grady | G06T 7/0012 703/2 |
| 2015/0094838 A1 | 4/2015 | Mac Laverty | |
| 2015/0269282 A1* | 9/2015 | Nelaturi | G06F 17/50 700/98 |
| 2015/0331402 A1* | 11/2015 | Lin | G05B 15/02 700/119 |
| 2016/0129636 A1* | 5/2016 | Cudak | G05B 15/02 700/97 |
| 2016/0236414 A1* | 8/2016 | Reese | B29C 67/0088 |
| 2016/0236416 A1* | 8/2016 | Bheda | B29C 67/0088 |

FOREIGN PATENT DOCUMENTS

| | | | | |
|---|---|---|---|---|
| CN | 103690278 | | 4/2014 | |
| CN | 103860294 | | 6/2014 | |
| WO | 2012123693 A1 | | 9/2012 | |
| WO | WO 2014085913 A1 | * | 6/2014 | ........... A61F 2/5046 |
| WO | WO2015023495 | | 2/2015 | |
| WO | WO 2017066101 A1 | * | 4/2017 | ............... A61B 3/14 |

\* cited by examiner

DATA DRIVEN FRAMEWORK FOR OPTIMIZING ARTIFICIAL ORGAN PRINTING AND SCAFFOLD SELECTION FOR REGENERATIVE MEDICINE

TECHNICAL FIELD

The present disclosure relates to a framework for optimizing artificial organ printing and scaffold selection for regenerative medicine. The techniques described herein may be applied, for example, to the printing of organs and/or scaffolding related to, for example, artificial limbs, heart, valves, vasculature, kidney, lungs, liver, prostate, bladder, ovaries, eye, and skin.

BACKGROUND

Many diseases are currently treated with replacement or repair of the affected anatomy. In most cases, a device is implanted to mimic the morphology and function of the original anatomy. For example, bare metal and drug eluting stents are used for the treatment of coronary artery disease, scaffolds are used for treating aortic aneurisms, and artificial aortic valves are used for valve replacements. However most of the devices suffer from the lack of bio-compatibility and personalization. As most replacement devices are based on metal parts for structural integrity (e.g., coronary stents) they incite immune responses. In addition, current devices come only in a discrete set of options, mostly to reduce development and manufacturing cost. For example, aortic valve replacement devices are usually available in three options which vary in size (e.g., with 3 mm gaps between models). Thus, there is a significant lack of personalization as the anatomy of the patient can exhibit a large variety of distinct shapes which are not possible to capture with a limited number of discrete device options.

Accordingly, a more personalized device creation approach is desired in clinical practice. Expectations are that personalized devices can improve current procedural outcomes. In the case of complex anatomical deformations, such as in pediatric cases, a personalized model may be the only viable option.

SUMMARY

Embodiments of the present invention address and overcome one or more of the above shortcomings and drawbacks, by providing methods, systems, and apparatuses related to a data driven framework that may be applied to organ printing and scaffold selection for regenerative medicine applications. The disclosed techniques enable morphological modeling of the affected anatomy and subsequent design of the optimal organ model using a computational model. Instead of optimizing only the computational model in respect to its parameters, the printer specifications are incorporated in the optimization procedure. The final model can be printed using 3D bio-printers and used directly for organ replacement. The disclosed techniques also enable morphological modeling of the affected anatomy and subsequent design of the optimal scaffold. The final scaffold design can be manufactured (e.g., using 3D printers) and used either directly or as a mold for scaffolds requiring specific materials that cannot be printed.

According to some embodiments, a method for generating a personalized scaffold for an individual includes acquiring images of an anatomy of interest corresponding to an intended scaffold location and acquiring test results related to the anatomy of interest. One or more functional specifications are generated based on the images and test results. In some embodiments of the aforementioned method, the functional specifications comprise one or more computational model parameters. These computational model parameters may include, for example, an indication of geometrical features and/or mechanical properties of the anatomy of interest. The functional specifications may also (or alternatively) comprise one or more clinical parameters. These clinical parameters may include, for example, one or more of a diameter, ejection fraction, flow, or volume corresponding to the anatomy of interest. Once the functional specifications are generated, they may be used to select one or more scaffold parameters. In some embodiments of the aforementioned method, the scaffold parameters are selected based on the one or more functional specifications by selecting an initial set of scaffold parameters from a database based on the functional specifications and then optimizing the initial set of scaffold parameters using a functional computational model to yield the functional specifications. Once the scaffold parameters are selected, they may be used to generate a final scaffold.

Various techniques may be applied to generate the final scaffold in the aforementioned method. In some embodiments, the final scaffold is generated using an additive manufacturing process. This additive manufacturing process may include, for example, the generation of a stereolithography (STL) tetrahedral model with material properties for each tetrahedral corresponding to the scaffold parameters. In other embodiments, the final scaffold is generated by creating a mold based on the one or more scaffold parameters and using the mold to grow the final scaffold. In other embodiments, the scaffold parameters comprise a set of optimal printer parameters the final scaffold is generated by identifying a mapping function which describes a relationship between the one or more functional specifications and printer parameters corresponding to a three-dimensional printer and selecting one or more desired output characteristics. The set of optimal printer parameters are generated by optimizing the mapping function according to the one or more desired output characteristics. Then, the three-dimensional printer may be used to print a personalized organ according to the set of optimal printer parameters.

According to other embodiments of the present invention, a method for generating a personalized organ model for an individual includes acquiring images of an anatomy of interest corresponding to an organ and acquiring test results related to the anatomy of interest. One or more current functional specifications (e.g., computational model parameters and/or clinical parameters) are determined based on the images and test results. Then, a mapping function is identified which describes a relationship between the one or more current functional specifications and printer parameters corresponding to a three-dimensional bio-printer. Desired output characteristics are selected and a set of optimal printer parameters are generated by optimizing the mapping function according to the one or more desired output characteristics. The three-dimensional bio-printer may then be used to print a personalized organ replacement according to the set of optimal printer parameters.

According to other embodiments, a system for generating a personalized regenerative medicine device (e.g., replacement organ) includes an imaging device, a processing computer, and a three-dimensional printer (e.g., a bio-printer). The imaging device is configured to acquire images of an anatomy of interest corresponding to an intended usage location of the personalized regenerative medicine device.

The processing computer is configured to receive the images of the anatomy of interest from the imaging device, acquire test results related to the anatomy of interest, generate one or more functional specifications based on the images and test results, and determining one or more printer parameters based on the one or more functional specifications. In some embodiments, the printer parameters comprise a set of optimal printer parameters determined by identifying a mapping function which describes a relationship between the functional specifications and available printer parameters corresponding to the three-dimensional printer. One or more desired output characteristics are selected and the set of optimal printer parameters are generated by optimizing the mapping function according to the one or more desired output characteristics. The three-dimensional printer in the aforementioned system is configured to generate the personalized regenerative medicine device using the one or more printer parameters.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

The following disclosure describes the present invention according to several embodiments directed at methods, systems, and apparatuses related to processing medical images and clinical patent data to provide personalized structures and engineered tissues for use in regenerative medicine applications. For example, in some embodiments, the techniques described herein may be used to create a personalized "scaffold." The term scaffold, as used herein, refers to an artificial structure on which tissue growth cells may be implanted or 'seeded' to support three-dimensional tissue formation. Thus, a scaffold may be used to grow tissues in order to replace or repair diseased organs and anatomy. In other embodiments, an optimized and personalized organ model is developed with respect to a bio-printer. This model can be directly printed using the bio-printer and also used as a replacement for the diseased anatomy. The techniques described herein may be applied, for example, to the creation of structures related to artificial limbs, heart, valves, vasculature, kidney, lungs, liver, prostate, bladder, ovaries, eye, and skin.

Figure 1:
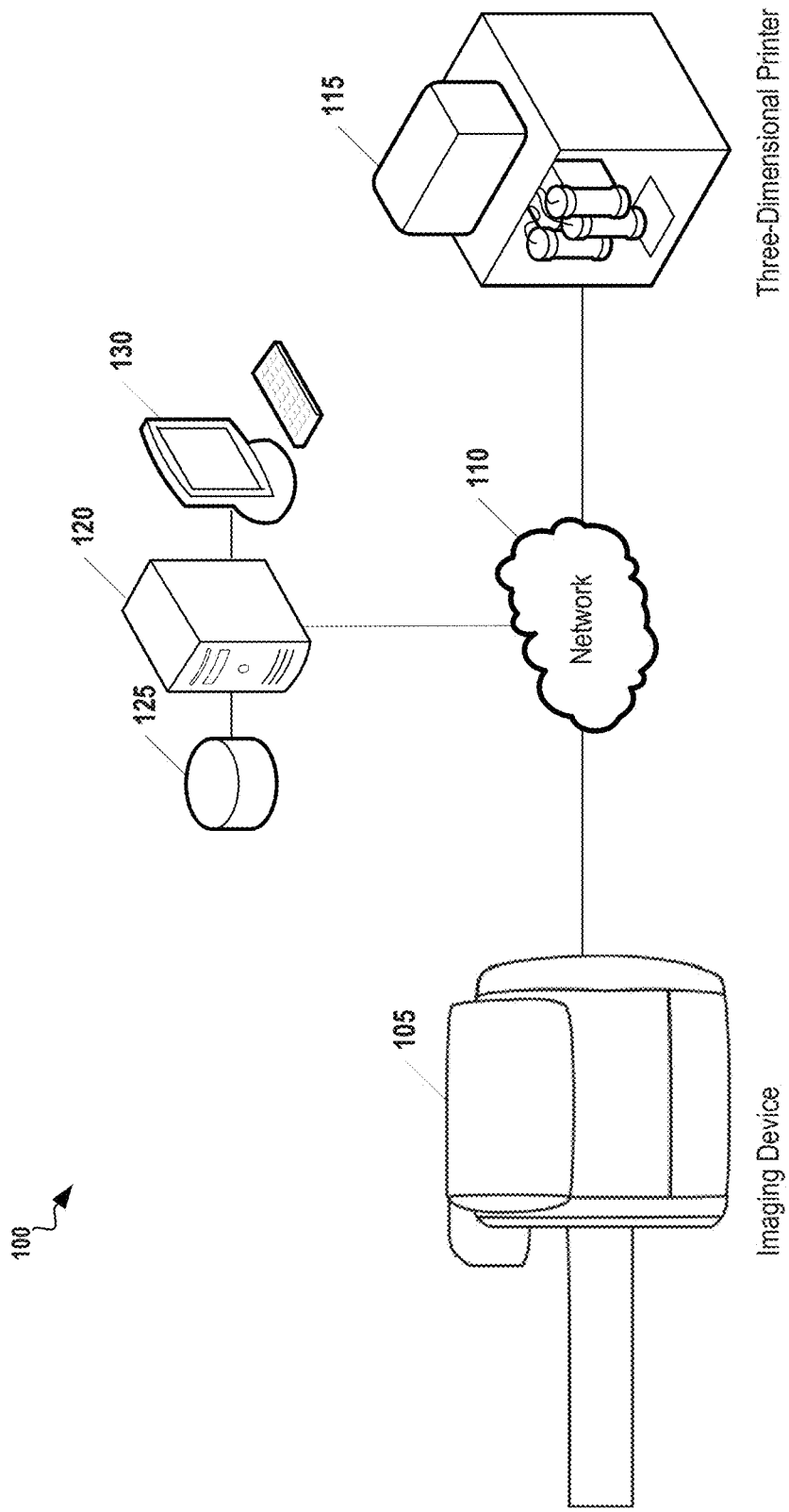
FIG. 1 illustrates a system for optimizing artificial organ printing and scaffold selection for regenerative medicine, according to some embodiments of the present invention.

FIG. 1 illustrates a system 100 for optimizing artificial organ printing and scaffold selection for regenerative medicine, according to some embodiments of the present invention. An Imaging Device 105 is used to acquire one or more images of an anatomy of interest. In the example of FIG. 1, a Magnetic Resonance Imaging (MR) scanner is shown. However, in other embodiments, other imaging devices generally known in the art may be employed such as, without limitation, a Computed Tomography (CT) scanner, a Positron Emission Tomography (PET) scanner, or an ultrasound device. Additionally, in some embodiments, imaging data is acquired using multiple modalities and aggregated to provide various types of image data corresponding to the anatomy of interest.

A Processing Computer 120 receives the image data from the Imaging Device 105 via a computer network 110. This computer network 110 may be configured using a variety of hardware platforms. For example, the computer network 110 may be implemented using the IEEE 802.3 (Ethernet) or IEEE 802.11 (wireless) networking technologies, either separately or in combination. In addition, the computer network 110 may be implemented with a variety of communication tools including, for example, TCP/IP suite of protocols. In some embodiments, the computer network 110 is the Internet. A virtual private network (VPN) may be used to extend a private network across the computer network 110. Image data received by the Processing Computer 120 may be stored in a Database 125. This Database 125 may be implemented, for example, using a database package such as Microsoft Access™ or a DBMS such as Microsoft SQL Server™, mySQL or postgreSQL.

The Processing Computer 120 is operably coupled to a User Interface 130 which allows clinicians to provide in-vitro and in-vivo test results to the Processing Computer 120. These test results may include, for example, measurements related to the anatomy of interest such as diameters, ejection fraction, flow, and volume. Based on the received images and test results, one or more functional specifications are developed. These functional specifications may include computational model parameters (e.g., geometry, mechanical properties such as tissue stiffness, etc.), clinical parameters/measurements (e.g., diameters, ejection fraction, flow, volume) or any other parameters specifying the anatomy and function of the organ of interest.

Continuing with reference to FIG. 1, the Processing Computer 120 uses the functional specifications to determine one or more parameters corresponding to a Three-Dimensional Printer 115. The printer parameters are optimized using the functional specifications to produce an output with desired characteristics. In some embodiments, a mapping function is identified which describes a relationship between the functional specifications and the printer parameters which are available on the Three-Dimensional Printer 115. The optimal printer parameters are generated by optimizing the mapping function according to the desired characteristics. This process is described in greater detail below with respect to FIG. 2.

Once generated the printer parameters generated by the Processing Computer 120 are sent to Three-Dimensional Printer 115 in order to print a regenerative medicine device. In some embodiments, the regenerative medicine device is a scaffold on which living cells may grow a replacement organ for the individual. In these embodiments, the Three-Dimensional Printer 115 uses an "ink" comprised of living cells and scaffolding material such as biodegradable polymers or collagen. The scaffolding material provides a structure on which the cells will later grow. As each layer is printed, it is solidified (e.g., using heat, chemicals, or ultraviolet light). This layer-by-layer process is referred to as "additive manufacturing" because the finished scaffold is made by adding material to build up a three-dimensional shape. In other embodiments, the regenerative medicine device is a replacement organ and the Three-Dimensional Printer 115 is a bio-printer. As is understood in the art, a bio-printer uses additive manufacturing techniques to deposit living cell material in layers whose thickness depends on the tissue being printed. In some embodiments, the Three-Dimensional Printer 115 provides hybrid functionality such that the same printer can be used for generating scaffolding and/or replacement organs.

Once the Three-Dimensional Printer 115 has completed printing the organ, the tissues are stored in an incubator referred to as a "bioreactor." While in the bio-reactor, the tissues mature in preparation of use in the patient's body. Additionally, tests may be performed while the organ is in the bioreactor to confirm that it is able to perform as designed. It should be noted that, in some embodiments, a specialized bio-printer may be used to print directly in the patient's body. In this case, the printed tissue can mature directly in the patient's body and incubation in the bioreactor can be omitted.

Figure 2:
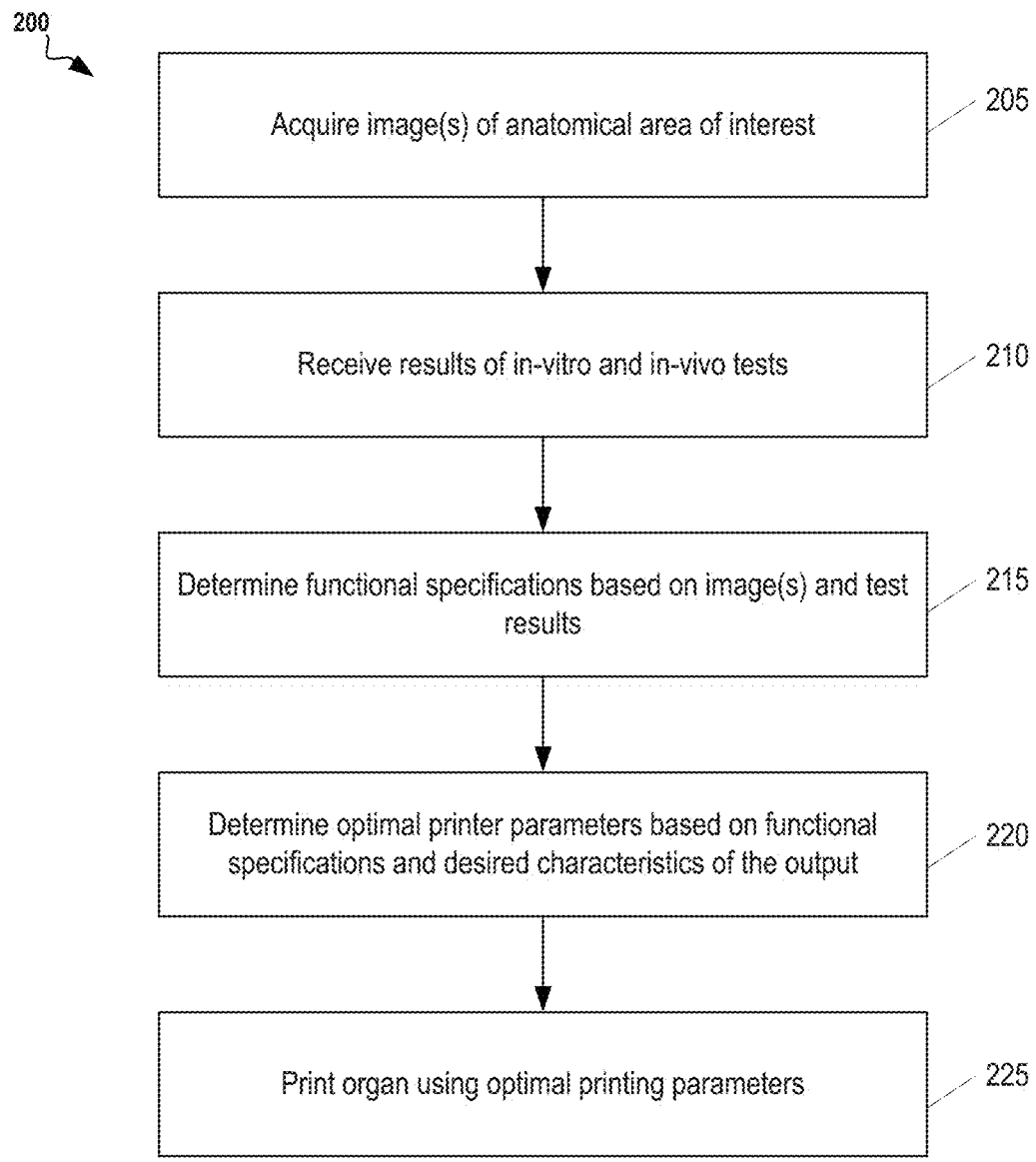
FIG. 2 provides an example process for manufacturing an anatomical organ, according to some embodiments of the present invention.

FIG. 2 provides an example process 200 for manufacturing an anatomical organ, according to some embodiments of the present invention. At step 205, images of the anatomical area of interest (including the anatomical organ of interest) are acquired using one or more imaging devices (e.g., Imaging Device 105 in FIG. 1). The image data may be acquired using any technique known in the art including, without limitation, acquisition techniques which employ CT, Ultrasound, and MRI imaging modalities. Data can be temporal (i.e., acquired at different time stamps) or non-temporal in nature. At step 210 the results of one or more in-vitro and in-vivo tests related to the anatomical organ of interest are received. The exact tests performed to generate the information received at step 210 will vary, for example, based on organ of interest and any diseases or disorders present in that organ. For example, tests may be performed on a valve to measure flow or volume.

Next, at step 215, the organ of interest is measured and modeled based on the acquired data, resulting in functional specification $v_0$. The functional specification $v_0$ can represent computational model parameters (e.g., geometry, mechanical properties such as tissue stiffness, geometry, etc.), clinical parameters/measurements (e.g., diameters, ejection fraction, flow, volume) or any other parameters specifying anatomy and function of the organ.

At step 220, the functional specification $v_0$ is used to determine parameters for a bio-printer capable of printing the organ. The output of the bio-printer is a mapping function M from the input $v_0$ to the desired characteristics of the output $v_1$ whereby the printer is controlled by its settings p:

$$\|v_1 - M(p, v_0)\| < \delta; \delta \geq 0$$

where δ is an infinitesimal number and p are the printing parameters. These printing parameters vary according to the model and available features of the bio-printer. Examples of parameters that may be used include, without limitation, nozzle diameter, pressure on material, and print speed. In some embodiments, the available printing parameters are specified in a range of values to simplify the identification of viable parameter combinations.

In some embodiments, an optimization approach is used to find optimized printing parameters $\bar{p}$ which minimize the deviation of the desired output $v_1$ and the printer output, characterized by the mapping function $M(p, v_0)$ with respect to the printer parameters p:

$$O_p(v_1, M(p, v_0)) = \min_p \|v_1 - M(p, v_0)\|$$

Various techniques may be used for solving this equation including, for example, techniques that employ gradient methods (e.g., gradient descent). Finally, at step 225, the organ is printed with the optimal printer parameters $\bar{p}$. The printed organ may then be used as a replacement for the diseased organ or anatomy.

Figure 3:
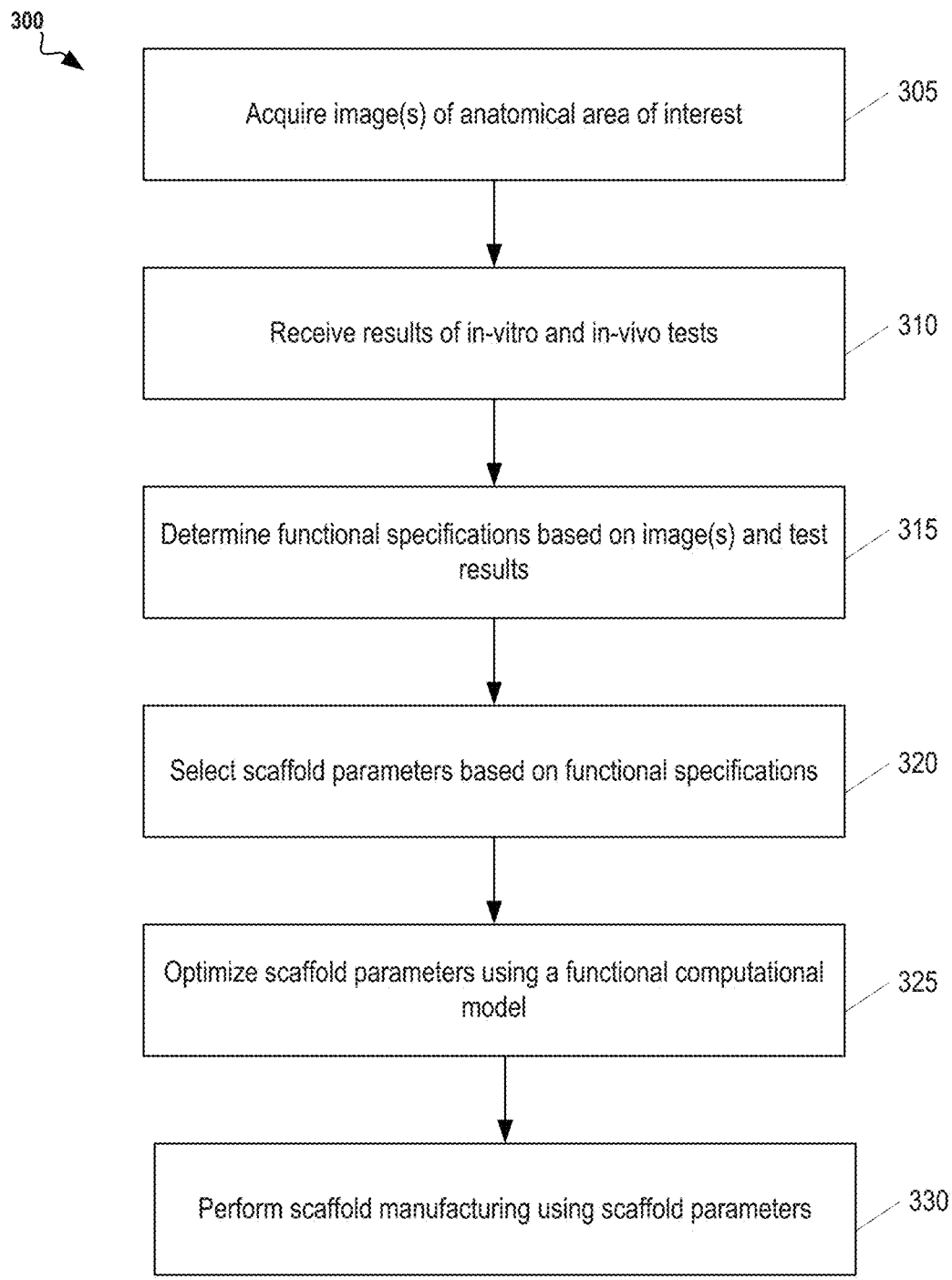
FIG. 3 provides an example process for manufacturing a patient-specific scaffold, according to some embodiments.

FIG. 3 provides an example process 300 for manufacturing a patient-specific scaffold, according to some embodiments. The process 300 shown in FIG. 3 extends the general concepts presented in FIG. 2 to situations where a scaffold for an organ, rather than the organ itself, is created using a three-dimensional printer. At step 305, images of the anatomy of interest (including the organ(s) of interest) are acquired. The image data may be acquired using any technique known in the art including, without limitation, techniques which employ CT, Ultrasound, and MRI imaging modalities. In some instances, the acquired data can be temporal (i.e., acquired at different time stamps). At step 310 the results of one or more in-vitro and in-vivo tests related to the anatomical organ of interest are received. As with the example discussed above with respect to FIG. 2, the exact information included in the test results will vary according the anatomy and diseases being targeted.

Next, at step 315, the patient data acquired at step 305 is used to measure and model the organ of interest in order to generate a functional specification v of the organ. The functional specification v can represent computational model parameters (e.g., geometry, mechanical properties such as tissue stiffness, etc.), clinical parameters/measurements (e.g., diameters, ejection fraction, flow, volume) or any other parameters specifying the anatomy and function of the organ. Some of these measurements may be made directly on the image data acquired at step 305. For example, the diameter of a valve may be measured in the image directly either manually or using automatic techniques generally known in the art. For more complex information, a 3D model of the organ can be developed from the image data and/or test results acquired at steps 305 and 310, again using any technique known in the art. Using the model, organ structure and behavior can be more thoroughly analyzed in order to develop a more robust functional specification v for the organ.

Continuing with reference to FIG. 3, at step 320, the optimal scaffold parameters $s_0$ which can be used for manufacturing are selected based on the functional specification v. At 320, a correlation between v and s is determined based on pre-existing patient data (e.g., stored in a database). For example, v can represent geometry information of the ideal scaffold. Thus, given a database of healthy patients where v is known, a similar patient can be found based on the functional specifications v (e.g., using Euclidean distance or another appropriate similarity metric to compare v to database record.

At step 325, the specifications of the scaffold v are optimized based on a functional computational model. The computational model applied at step 325 is a functional model and different scaffold parameter settings s can be explored in respect to their effect on the anatomical and functional properties of the anatomy or organ. The scaffold parameters s are a sub-set of all parameters of the computational models. The computational model can help one to verify cheaply (without 3D printing) the effects of certain scaffold parameters s in respect to the functional specification v. For example, consider a patient that is close to heart failure and requires a heart replacement. The goal may be to bring the Ejection Fraction to greater than 50% (so this would be the functional specification v). Now one of the parameters of the computational model (and scaffold) is the geometry. From N possible changes of the initial geometry the computational model could simulate the effects on the Ejection Fraction and the best configuration would be used for the scaffold (or direct organ printing).

Finally, at step 330, scaffold manufacturing is performed. During this step the final scaffold is manufactured on which tissue will grow. Various techniques may be used to perform the manufacturing using the scaffold parameters s. For example, in some embodiments, additive manufacturing using 3D printers is employed. This might involve generating a CAD stereolithography (STL) tetrahedral model with specific material properties for each tetrahedral. In other embodiments, a mold is created to build the scaffold with specific material that cannot be printed.

Figure 4:
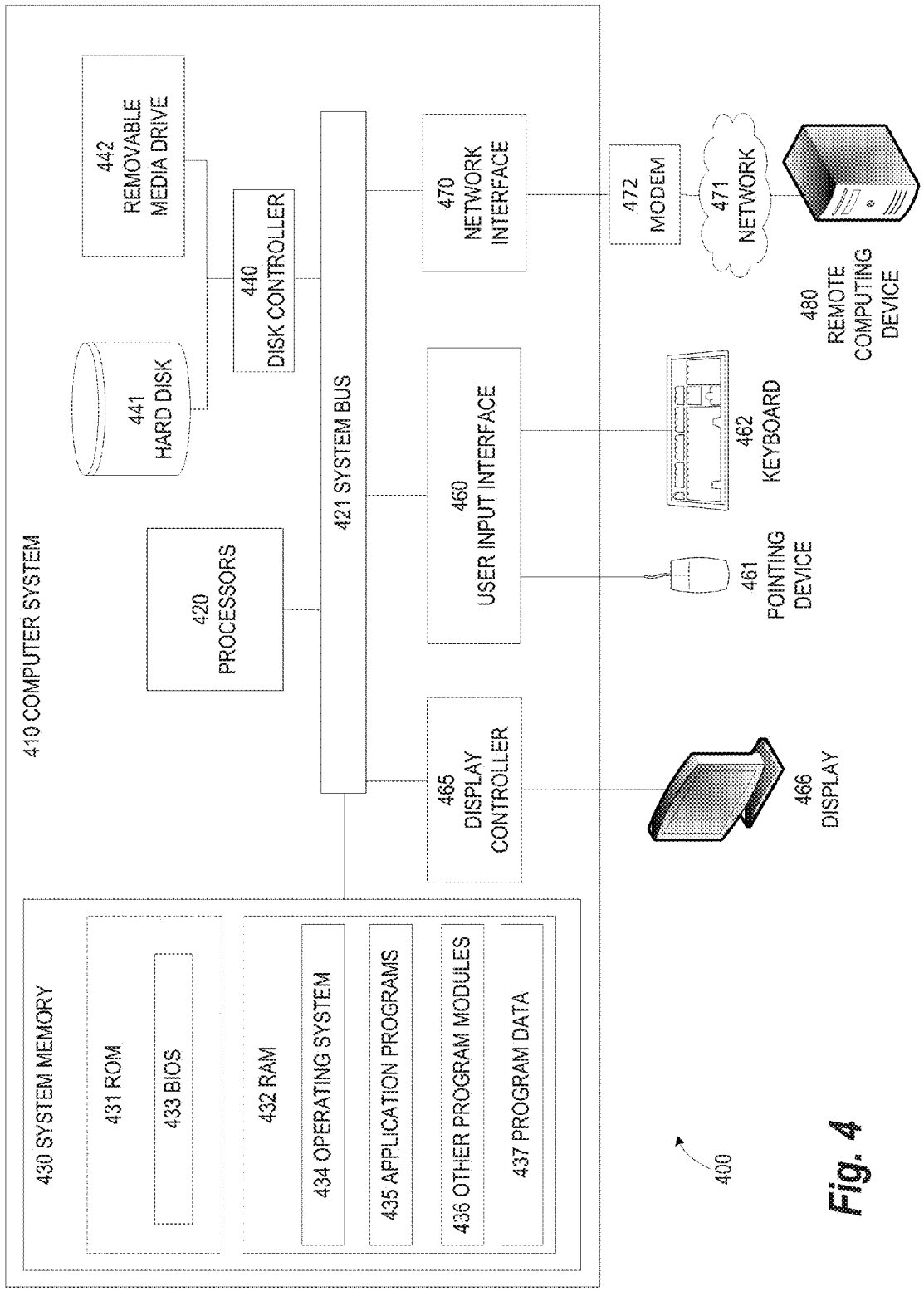
FIG. 4 illustrates an exemplary computing environment within which embodiments of the invention may be implemented.

FIG. 4 illustrates an exemplary computing environment 400 within which embodiments of the invention may be implemented. In some embodiments, the computing environment 400 may be used to implement one or more of the components illustrated in the system 100 of FIG. 1. For example, this computing environment 400 may be configured to execute the processes 200, 300 described above with respect to FIGS. 2 and 3, respectively. Computers and computing environments, such as computer system 410 and computing environment 400, are known to those of skill in the art and thus are described briefly here.

As shown in FIG. 4, the computer system 410 may include a communication mechanism such as a bus 421 or other communication mechanism for communicating information within the computer system 410. The computer system 410 further includes one or more processors 420 coupled with the bus 421 for processing the information. The processors 420 may include one or more central processing units (CPUs), graphical processing units (GPUs), or any other processor known in the art.

The computer system 410 also includes a system memory 430 coupled to the bus 421 for storing information and instructions to be executed by processors 420. The system memory 430 may include computer readable storage media in the form of volatile and/or nonvolatile memory, such as read only memory (ROM) 431 and/or random access memory (RAM) 432. The system memory RAM 432 may include other dynamic storage device(s) (e.g., dynamic RAM, static RAM, and synchronous DRAM). The system memory ROM 431 may include other static storage device(s) (e.g., programmable ROM, erasable PROM, and electrically erasable PROM). In addition, the system memory 430 may be used for storing temporary variables or other intermediate information during the execution of instructions by the processors 420. A basic input/output system (BIOS) 433 containing the basic routines that help to transfer information between elements within computer system 410, such as during start-up, may be stored in ROM 431. RAM 432 may contain data and/or program modules that are immediately accessible to and/or presently being operated on by the processors 420. System memory 430 may additionally include, for example, operating system 434, application programs 435, other program modules 436 and program data 437.

The computer system 410 also includes a disk controller 440 coupled to the bus 421 to control one or more storage devices for storing information and instructions, such as a hard disk 441 and a removable media drive 442 (e.g., floppy disk drive, compact disc drive, tape drive, and/or solid state drive). The storage devices may be added to the computer system 410 using an appropriate device interface (e.g., a small computer system interface (SCSI), integrated device electronics (IDE), Universal Serial Bus (USB), or FireWire).

The computer system 410 may also include a display controller 465 coupled to the bus 421 to control a display 466, such as a cathode ray tube (CRT) or liquid crystal display (LCD), for displaying information to a computer user. The computer system includes an input interface 460 and one or more input devices, such as a keyboard 462 and a pointing device 461, for interacting with a computer user and providing information to the processor 420. The pointing device 461, for example, may be a mouse, a trackball, or a pointing stick for communicating direction information and command selections to the processor 420 and for controlling cursor movement on the display 466. The display 466 may provide a touch screen interface which allows input to supplement or replace the communication of direction information and command selections by the pointing device 461.

The computer system 410 may perform a portion or all of the processing steps of embodiments of the invention in response to the processors 420 executing one or more sequences of one or more instructions contained in a memory, such as the system memory 430. Such instructions may be read into the system memory 430 from another computer readable medium, such as a hard disk 441 or a removable media drive 442. The hard disk 441 may contain one or more datastores and data files used by embodiments of the present invention. Datastore contents and data files may be encrypted to improve security. The processors 420 may also be employed in a multi-processing arrangement to execute the one or more sequences of instructions contained in system memory 430. In alternative embodiments, hard-wired circuitry may be used in place of or in combination with software instructions. Thus, embodiments are not limited to any specific combination of hardware circuitry and software.

As stated above, the computer system 410 may include at least one computer readable medium or memory for holding instructions programmed according to embodiments of the invention and for containing data structures, tables, records, or other data described herein. The term "computer readable medium" as used herein refers to any medium that participates in providing instructions to the processor 420 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 441 or removable media drive 442. Non-limiting examples of volatile media include dynamic memory, such as system memory 430. Non-limiting examples of transmission media include coaxial cables, copper wire, and fiber optics, including the wires that make up the bus 421. Transmission media may also take the form of acoustic or light waves, such as those generated during radio wave and infrared data communications.

The computing environment 400 may further include the computer system 410 operating in a networked environment using logical connections to one or more remote computers, such as remote computer 480. Remote computer 480 may be a personal computer (laptop or desktop), a mobile device, a server, a router, a network PC, a peer device or other common network node, and typically includes many or all of the elements described above relative to computer system 410. When used in a networking environment, computer system 410 may include modem 472 for establishing communications over a network 471, such as the Internet. Modem 472 may be connected to bus 421 via user network interface 470, or via another appropriate mechanism.

Network 471 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 410 and other computers (e.g., remote computer 480). The network 471 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 471.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A method for generating a personalized organ model for an individual, the method comprising:
acquiring images of an anatomy of interest corresponding to an organ;
acquiring test results related to the anatomy of interest;
determining one or more current functional specifications based on the images and test results;
identifying a mapping function which describes a relationship between the one or more current functional specifications and printer parameters corresponding to a three-dimensional bio-printer;
selecting one or more desired output characteristics;
generating a set of optimal printer parameters by optimizing the mapping function according to the one or more desired output characteristics; and
using the three-dimensional bio-printer to print a personalized organ replacement according to the set of optimal printer parameters.

2. The method of claim 1, wherein the one or more functional specifications comprise of one or more computational model parameters.

3. The method of claim 2, wherein the one or more computational model parameters comprise of an indication of geometrical features of the anatomy of interest.

4. The method of claim 2, wherein the one or more computational model parameters comprise of an indication of mechanical properties in the anatomy of interest.

5. The method of claim 1, wherein the one or more functional specifications comprise of one or more clinical parameters.

6. The method of claim 5, wherein the one or more clinical parameters comprise of one or more of a diameter, ejection fraction, flow, or volume corresponding to the anatomy of interest.

7. A system for generating a personalized regenerative medicine device, the system comprising:
   an imaging device configured to acquire images of an anatomy of interest corresponding to an intended usage location of the personalized regenerative medicine device;
   a processing computer configured to:
      receive the images of the anatomy of interest from the imaging device, acquire test results related to the anatomy of interest,
      generate one or more functional specifications based on the images and test results,
      identify a mapping function which describes a relationship between the one or more functional specifications and printer parameters,
      identify one or more desired output characteristics, and
      generate one or more optimal printer parameters by optimizing the mapping function according to the one or more desired output characteristics; and
   a three-dimensional printer generates the personalized regenerative medicine device using the one or more optimal printer parameters.

8. The system of claim 7, wherein the personalized regenerative medicine device comprises of a replacement organ and the three-dimensional printer comprises of a bio-printer.

* * * * *